US008972898B2

(12) United States Patent
Carter (10) Patent No.: US 8,972,898 B2
(45) Date of Patent: Mar. 3, 2015

(54) TECHNIQUES FOR REPRESENTING AND NAVIGATING INFORMATION IN THREE DIMENSIONS (75) Inventor: Stephen R. Carter, Spanish Fork, UT (US)

(73) Assignee: Novell Intellectual Properties, Inc., Provo, UT (US)

( * ) Notice: Subject to any disclaimer, the term of this patent is extended or adjusted under 35 U.S.C. 154(b) by 1420 days.

(21) Appl. No.: 11/671,660

(22) Filed: Feb. 6, 2007

(65) Prior Publication Data
US 2008/0186305 A1 Aug. 7, 2008

(51) Int. Cl.
G06F 3/048 (2013.01)
G06T 19/00 (2011.01)
G06T 15/04 (2011.01)

(52) U.S. Cl.
CPC ............... *G06T 19/00* (2013.01); *G06T 15/04* (2013.01)
USPC ........................... 715/850; 715/757; 715/848

(58) Field of Classification Search
CPC ............................................... G06F 3/04815
USPC .......... 345/419; 715/751, 753, 759, 760, 764, 715/766, 782, 848, 850, 851, 852, 854, 757, 715/765, 863; 713/165–167; 709/204
See application file for complete search history.

(56) References Cited

U.S. PATENT DOCUMENTS

| 5,303,388 | A | * | 4/1994 | Kreitman et al. | 715/836 |
|---|---|---|---|---|---|
| 5,689,287 | A | * | 11/1997 | Mackinlay et al. | 345/427 |
| 5,900,879 | A | | 5/1999 | Berry et al. | |
| 5,987,246 | A | * | 11/1999 | Thomsen et al. | 717/109 |
| 6,285,317 | B1 | | 9/2001 | Ong | |
| 6,356,840 | B2 | | 3/2002 | Kusama | |
| 6,501,469 | B1 | | 12/2002 | MacPhail | |
| 6,597,358 | B2 | * | 7/2003 | Miller | 345/427 |
| 6,628,310 | B1 | * | 9/2003 | Hiura et al. | 715/776 |
| 6,822,638 | B2 | | 11/2004 | Dobies et al. | |
| 6,822,662 | B1 | * | 11/2004 | Cook et al. | 715/788 |
| 6,922,815 | B2 | * | 7/2005 | Rosen | 715/782 |
| 6,938,218 | B1 | * | 8/2005 | Rosen | 715/850 |
| 7,013,435 | B2 | * | 3/2006 | Gallo et al. | 715/850 |
| 7,134,095 | B1 | | 11/2006 | Smith et al. | |
| 7,139,932 | B2 | | 11/2006 | Watanabe | |
| 7,216,305 | B1 | * | 5/2007 | Jaeger | 715/849 |
| 7,249,327 | B2 | * | 7/2007 | Nelson et al. | 715/782 |
| 7,263,667 | B1 | * | 8/2007 | Hoellerer et al. | 715/782 |
| 7,475,242 | B2 | * | 1/2009 | Baird et al. | 713/166 |

(Continued)

OTHER PUBLICATIONS

"SUSE Linux Enterprise Desktop 10: Features and Benefits", http://www.novell.com/products/desktop/features.html. Novell,(2007).

(Continued)

Primary Examiner — Haoshian Shih
(74) Attorney, Agent, or Firm — Schwegman Lundberg & Woessner, P. A.

(57) ABSTRACT

Techniques for representing and navigating information in three dimensions are provided. Information content is rendered to at least one side of a three-dimensional representation of a graphical shape. Summary information is link to the information from a top of the shape. The information also links to background information housed on a bottom of the shape. Links can be activated and the shape can be rotated in any direction to navigate the information, the summary information, and the background information within the shape.

31 Claims, 7 Drawing Sheets

(56) References Cited

U.S. PATENT DOCUMENTS

| | | |
|---|---|---|
| 7,676,767 B2 * | 3/2010 | Hofmeister et al. .......... 715/863 |
| 2002/0105551 A1 | 8/2002 | Kamen et al. |
| 2002/0180809 A1 | 12/2002 | Light et al. |
| 2003/0142136 A1 * | 7/2003 | Carter et al. ................. 345/782 |
| 2004/0139143 A1 | 7/2004 | Canakapalli et al. |
| 2005/0005245 A1 | 1/2005 | Card et al. |
| 2005/0005246 A1 | 1/2005 | Card et al. |
| 2005/0081160 A1 * | 4/2005 | Wee et al. ..................... 715/755 |
| 2005/0097440 A1 * | 5/2005 | Lusk et al. ................. 715/500.1 |
| 2005/0179667 A1 | 8/2005 | Nilsson et al. |
| 2009/0307623 A1 * | 12/2009 | Agarawala et al. ........... 715/765 |

OTHER PUBLICATIONS

"VRML Virtual Reality Modeling Language", http://www.w3.org/MarkUp/VRML/, (1995).

* cited by examiner

TECHNIQUES FOR REPRESENTING AND NAVIGATING INFORMATION IN THREE DIMENSIONS

FIELD

The invention relates generally to data modeling and data navigation. More particularly, the invention relates to techniques for representing and navigating information in three dimensions.

BACKGROUND

To a large extent the manner in which individuals view, assimilate, and traverse information on the Internet has remained unchanged for over a decade. Information is encoded in a hypertext language, such as Hyper Text Markup Language (HTML) and it includes intra-document or inter-document links represented as Uniform Resource Locator (URL sometimes called Uniform Resource Identifier (URI)) links within the HTML. The information can be linked across the globe over the Internet using the URL's in what is commonly known as the World-Wide Web (WWW).

Although security, content, operational feature, and performance improvements have been made, the basic paradigm within which information is viewed and navigated within WWW browsers has remained the same for over a decade. The model is a two dimensional view of the information without any proximity-based relationships being capable of being adequately depicted and represented.

For example, suppose a brainstorming session was to be captured and depicted as a document or set of information on the WWW using a conventional browser. In the brainstorming session, the physical placement of information relative to other information is of significance. In fact, an entire room rather than a single sheet of paper is used or can be used in the session. A traditional browser cannot and would not be capable of showing these proximity-based relationships in a manner that it is actually witnessed from the perspective of a participant or a viewer to the actual brainstorming session. Part of this problem stems from the dual dimensionality of the WWW browser paradigm and the other part of the problem stems from lack of adequate metadata to support more intuitive information navigation.

Thus, what are needed are techniques, which allow for improved information representations and navigation capabilities.

SUMMARY

In various embodiments, techniques for representing and navigating information in three dimensions are presented. More specifically, and in an embodiment, a method is provided for rendering and navigating information in three dimensions. Information is rendered to at least one side of a three-dimensional graphical shape. Summary information is generated on a top of the three-dimensional graphical shape for the information, and selective portions of the summary information map to selective portions of the information. Background information is also linked from the information on a bottom of the three-dimensional graphical shape. Next, proximity-based navigation is enabled within the three-dimensional graphical shape for the at least one side, the top, and the bottom so that a user can navigate the information with a three-dimensional perspective.

DETAILED DESCRIPTION

"Information" refers to content herein. Correspondingly, "information" and "content" may be used interchangeably with one another in the descriptions that follow. Content can include text, graphics, video, audio, images, etc.

"Summary information" refers to information about or related directly to primary content or information. In an embodiment, the summary information is index terms for the primary information or thesaurus terms related to index terms. The summary information may also include graphics or icons that map, describe, or are directly associated with portions of the primary content. In some cases, the summary information may be categories related topics in the primary content.

"Background information" refers to related information associated with the primary content. In an embodiment, the background information is a discussion or video related to the development or production of the primary information. In other cases, the background information is information related to the producer or producers of the primary content or the manner and/or process associated with producing the primary content. In a WWW site scenario, the "about" an enterprise page or link may be viewed as background information. Any related, secondary, or ancillary information about the primary information may be considered background information.

A "service" is a type of resource that includes machine instructions, which are embodied in a machine or computer-readable medium and are adapted to process on a machine (processing device, such as a computer, phone, personal digital assistant (PDA), television, laptop, etc.).

Various embodiments of this invention can be implemented as enhancements to existing WWW browsers, as an entirely new type of WWW browser, as a collaboration tool, and as a service within an operating system. For example, in some embodiments, the techniques presented herein are implemented in whole or in part in XGL Linux products, distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5E.

Figure 1:
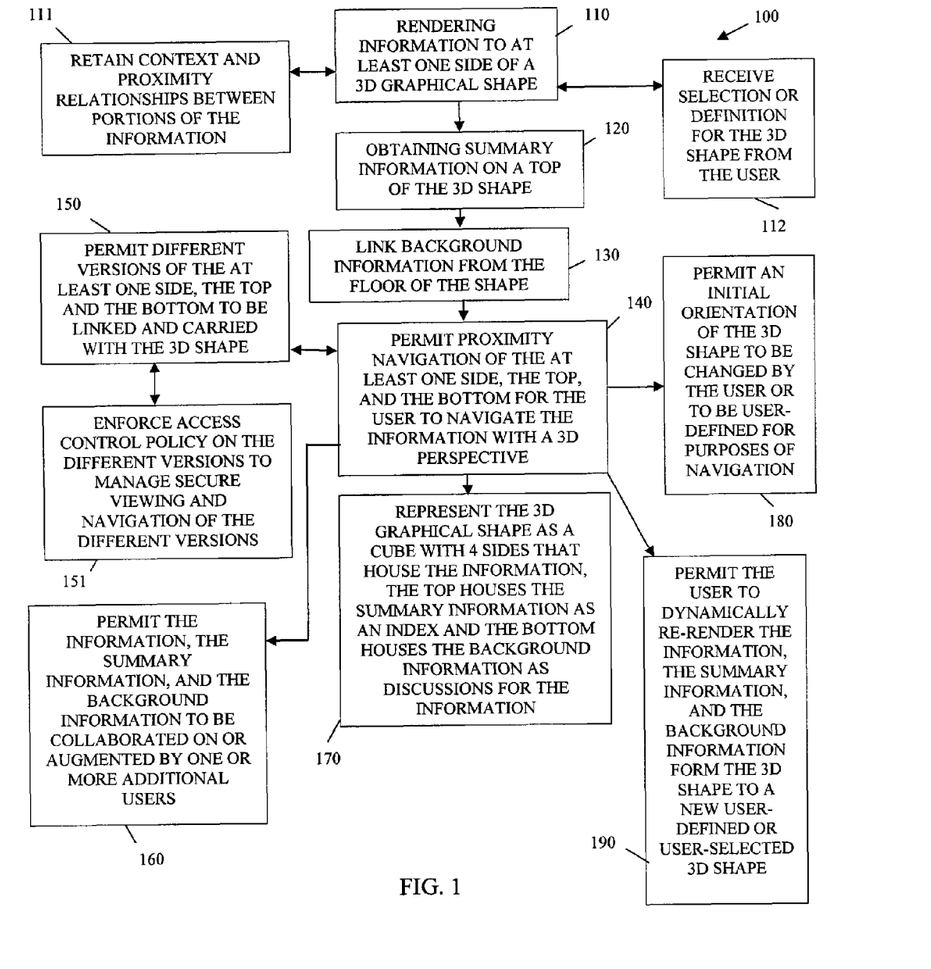
FIG. 1 is a diagram of a method for rendering and navigating information in three dimensions, according to an example embodiment.

FIG. 1 is a diagram of a method 100 for rendering and navigating information in three dimensions, according to an example embodiment. The method 100 (hereinafter "three dimensional (3D) rendering and navigation service") is implemented as instructions in a machine-accessible and readable medium. The instructions when executed by a machine perform the processing depicted in FIG. 1. The 3D rendering and navigation service is also operational over and processes within a network. The network may be wired, wireless, or a combination of wired and wireless. In some cases, the network is the WWW accessible via an Internet connection.

Initially, information or content about a subject is acquired. This can be achieved in a number of manners. For instance, a website page, an entire website (collection of WWW pages), a database, a presentation, a directory, a document, etc. It is also noted that the information may be provided to the 3D rendering and navigation service in a dynamic, real-time, or near real-time fashion, such that as it is being developed it is captured and streamed to the 3D rendering and navigation service. The above are not the only manners in which content or types of content can be captured. In fact, any automated or manual (or even combination of the two automated and manual) mechanism to capture and supply content in an electronic environment is intended to fall within the scope of the embodiments presented herein.

At 110, the 3D rendering and navigation service renders the information to at least one side of a 3D graphical shape. At 111, the 3D rendering and navigation service retains context and proximity based relationships between various portions of the information. For example, if the information was provided or captured as the result of a brainstorming meeting or any type or real world meeting, then the information provided has context as to where it was placed or situated in the meeting room relative to other pieces or portions of the information. This proximity-based context is retained when the information is rendered to the at least one side of the 3d graphical shape.

According to an embodiment, at 112, the 3D rendering and navigation service may receive a specific selection or definition for the 3D shape from a user. So, the 3D shape that models and represents the information and has the information rendered to at least one of its sides may be user-defined or user-selected.

Examples of cube-based shapes are provided in detail herein and below; specifically with reference to the FIGS. 2, 4, and 5A-E. It is understood that other 3D shapes may be used as well that include more or less than 4 sides. For example, a cylinder has three faces or sides, a top (depending upon the set orientation of the cylinder), a bottom (also dependent upon the set orientation of the cylinder), and a connecting body that connects the top and bottom. So, the cylinder includes at least one side that being the connecting body. Each 3D shape as used herein may be said to have at least one side, a top, and a bottom. The usage and context of these will become apparent with the descriptions that follow.

At 120, the 3D rendering and navigation service obtains summary information on a top of the 3D shape. The summary information may be automatically generated or manually acquired. That is, the information or content that is rendered to the at least one side of the 3D shape may be manually or automatically analyzed or parsed to acquire summary information about the information. An example form of summary information may include index terms, categories, thesaurus terms, foreign language translations, etc. The summary information may link to the specific in-context locations within the information rendered to the at least one side of the 3D shape. The summary information may also, in some cases, link to the specific in-context locations within other information rendered to other sides of other 3D shapes. So, the summary information permits linking or navigating in an intra-3D shape manner and in an inter-3D shape manner. It is however noted that the specific 3D shape to which the summary information is proximally associated or connected, since it is part of the same 3D shape, has the at least one side of that 3D shape, which proximity links to just its summary information. In other words, the 3D shape's sides or side have one top or a single set of summary information, but the actual summary information may link to other 3D shapes.

At 130, the 3D rendering and navigation service proximally links background information from a bottom associated with the 3D shape to the rendered information associated with the side or sides of the 3D shape. Background information can include such things as threaded discussions, captured or live chat sessions, emails, audio transcripts, videos, content about the process or related to the production of the information rendered to the side or sides of the 3D shape. Specific links within the information navigate or reference to specific portions of the background information. Again, the linkages between the information components on the side or sides of the 3D shape are proximally connected in context to background components. So, if the information was a brainstorming session and an information on a side indicated "opportunity to increase sales" with a bottom link; by activating the floor link from within the side, the 3D graphic shape is rotated in context to the floor and an audio related to capturing that bullet item on the side may be played.

At 140, the 3D rendering and navigation service permits proximity navigation of the side or sides, the top, and the bottom for purposes of allowing the user to navigate with a 3D perspective. Consequently, the user experiences a 3D view and feel for the information using the side or sides, the top, and the bottom of the 3D shape. This is distinctly different from the manner in which a traditional WWW browser works, where the navigation is not proximity based in 3D; rather it is just context based in 2D. However, individuals live in a 3D world and interact in that world for their entire existence; thus viewing, navigating, and consuming content in a manner that is more intuitive to their everyday life is extremely beneficial for comprehension and ease of use.

According to an embodiment, at 150, the 3D rendering and navigation service permits different versions of the at least one side, the top, and the bottom to be linked and carried with the 3D shape. In other words, there can be a variety of renderings for the side or sides, the top, and/or the bottom for the 3D shape. Each version can include different information that may be valuable, such as proposed changes not yet accepted, etc.

Moreover, each version may include some content that may require secrecy or privacy. Thus, at 151, the 3D rendering and navigation service may enforce access control policy on the different versions to manage secure viewing and navigation of the different versions. Identity based security and authentication may also be defined in the policy.

In an embodiment, at 160, the 3D rendering and navigation service may permit the information, the summary information, and the background information to be collaborated on or augmented by one or more additional users. For example, the 3D shape and its information, summary information, and background information may be a wiki, a blog, a brainstorming session occurring in real-time or near real-time, etc.

It may also be the case, at 170, that the 3D rendering and navigation service can represent the 3D shape as a cube with four sides that house the information. The top of the cube houses the summary information and the bottom of the cube houses the background information. The summary information may be an index to the content on the four sides and the background information discussions or threads related to the content on the four sides. More specific illustrations of this particular embodiment are described in detail below with reference to the FIGS. 2, 4, and 5A-E.

In an embodiment, at 180, the 3D rendering and navigation service can permit an initial orientation or even axis of rotation for the 3D shape to be changed or user-defined for purposes of navigation. So, if the 3D shape is a cube with a normal or default rotation of the four sides holding the content being from right to left or left to right; a user may redefine this to be up and down and down and up; such an orientation may be more intuitive to the user if the content is a text story or article that includes multiple pages of information. However, other uses may prefer to navigate such a story or article from right to left, since this is similar to turning pages in a magazine or book in the real world whereas the up and down navigation is similar to a WWW browser that scrolls text. The point is the user can define the manner in which the navigation orientation is to take place initially and the axis of rotation. The user can also dynamically change this to a different orientation or axis of rotation while navigating the 3D shape. Again, such ability to alter the orientation and axis of navigation is not available in traditional browsers.

According to an embodiment, at 190, the 3D rendering and navigation service may also permit the user to dynamically re-render the information, the summary information, and the background information from the original 3D shape to a new user-defined or user-selected 3D shape. So, not only can the user alter the navigation orientation of the information, but the user can also alter the 3D shape that the user is navigating. For example, a user could navigate information using a cube and dynamically switch to navigation using cylinder to house the information.

The above description fundamentally alters the manner in which content is represented and navigated by a user. Traditionally, representation and navigation occurs in two dimensions (2D); now with the teachings presented herein content is represented in user-defined 3D views and navigated using proximity contextual linking that entails rotating and spinning the 3D views to acquire proximally dependent content and metadata relationships that are self contained within a graphical 3D shape.

It is noted however that the embodiments herein do support external 3D shape linking, as is discussed in greater detail herein and below. Thus, the entire WWW can be re-rendered in a dynamic and/or in an as needed fashion to be represented in user-defined 3D shapes and navigated in 3D. Essentially, the manner in which the user views and navigates the WWW can be defined by the user and achieved in a user-desired 3D manner that mimics better how the user comprehends and interacts in the real world. This presents tremendous opportunities in an age where information overload is occurring and yet desired or needed content seems to still be elusive to the average user because of the inability of the average user to locate and comprehend needed content quickly and in an easy to comprehend and in an easy to consume fashion.

Figure 2:
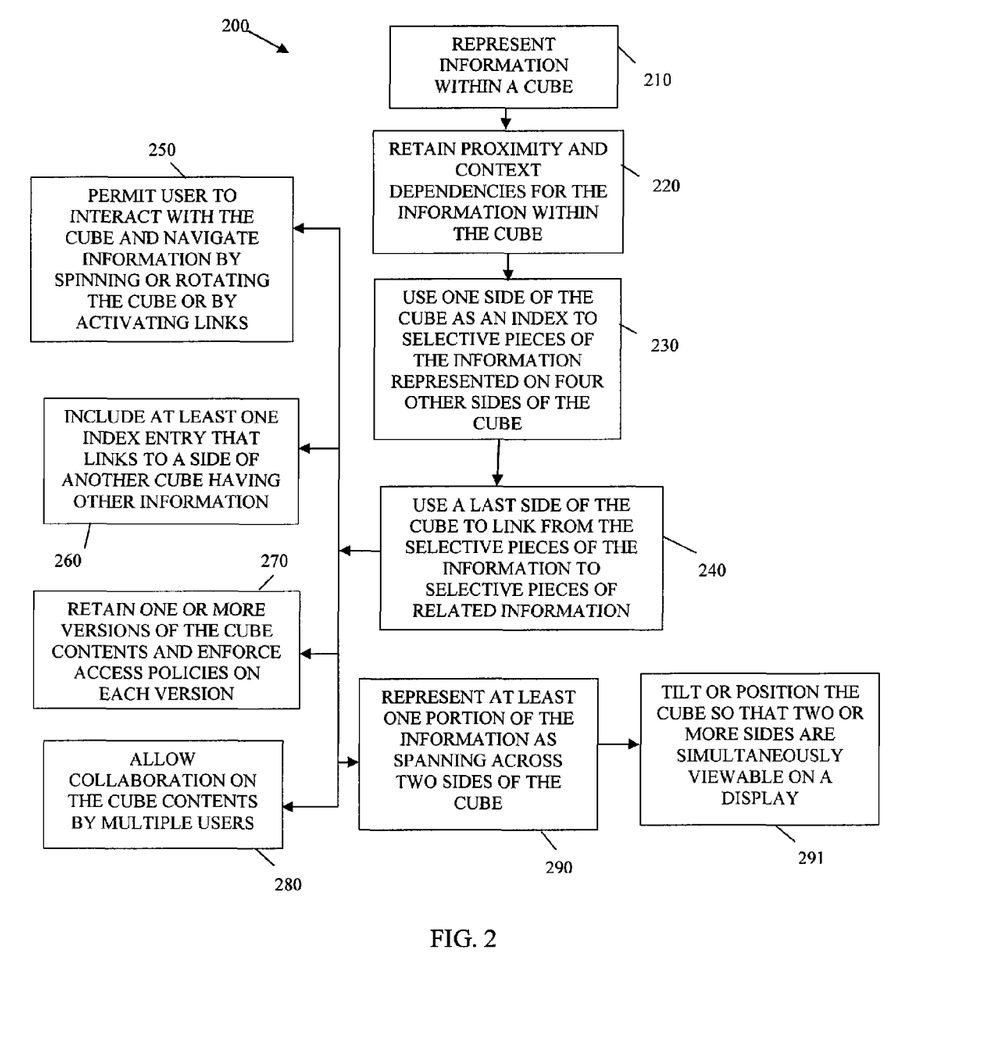
FIG. 2 is a diagram of another method for representing and navigating information in three dimensions, according to an example embodiment.

FIG. 2 is a diagram of another method 200 for representing and navigating information in three dimensions, according to an example embodiment. The method 200 (herein after referred to as "cube navigation service") is implemented in a machine-accessible and readable medium as instructions, which when accessed by a machine performs the processing depicted in the FIG. 2. The cube navigation service is also operational over a network; the network may be wired, wireless, or a combination of wired and wireless. The cube navigation service represents a specific 3D graphical shape embodiment of the 3D rendering and navigation service represented by the method 100 of the FIG. 1.

The method 100 of the FIG. 1 illustrated that any 3D shape could be used to render content and to navigate that content in proximity and context sensitive manners. The cube navigation service illustrates a specific implementation and usage of a particular 3D shape, such as a cube. Conceptually, and for comprehension the cube may be visualized as sitting in the palm of a user's hand and the user rotates and interacts with it.

At 210, the cube navigation service represents information in a 2D environment (computer or machine environment) in a 3D fashion. That is, the 2D presents and depicts a 3D cube. A variety of examples exist for such representations, such as CAD/CAM drawings, XGL desktop, distributed by Novell® Inc. of Provo, Utah, etc. 3D is regularly represented in the 2D computer or machine environment. Thus, the cube navigation service represents information in or from a 3D perspective within a cube (graphical and 3D shape).

At 220, the cube navigation service retains proximity and context dependencies for information rendered onto and within the cube. Thus, physical placement of portions or pieces of information (content) relative to other portions or pieces is retained and represented within the cube. This permits a variety of types of content to become valuable within the cube, such as affinity diagrams, brainstorming sessions, etc.

At 230, the cube navigation service uses one side of the cube as an index to selective pieces of the information represented on the four other sides of the cube. In other words, a designated top or ceiling of the cube includes index terms that proximally link (within the cube) and contextually link (within the cube) to specific pieces of the information housed on the four other sides (walls) of the cube. In an example case, the cube may be viewed logically as a room where the information or content is placed on the walls (four sides) and the index is located on the ceiling (top).

At 240, the cube navigation service uses a last side of the cube to link from the selective pieces of information to selective pieces of related information. The related information may be viewed as discussions, chats, emails, or content about the content (metadata) it is linked or proximally references specific contextually related pieces of the information. In the previous example, the related information may be viewed on the floor of the room (cube).

At this point, the information or content and its index and related data are rendered and available on or within the cube for navigation and manipulation by the user. Accordingly, a variety of actions or navigational opportunities may present itself and be handled by the cube navigation service.

In an embodiment, at 250, the cube navigation service permits the user to interact with the cube in a dynamic and real-time fashion on a display of a machine to navigate the information (content) by rotating the cube, spinning the cube, or by activating proximally based links placed on the walls, top, and/or bottom of the cube that when activated provide intra-cube navigation and linking in context.

However, at 260, the cube navigation service also permits inter-cube linking. Thus, at least one index entry may link or navigate to when activated another wall of a different cube having other contextually-related information (content). Similarly, the walls of the cube may include inter-link references to other walls of other cubes having other information. Moreover, the floor and its related information may include inter-link references to other walls of other cubes having other information. Therefore, inter-cube linkages can be achieved from the walls, top, and/or bottom of the cube. This permits the entire WWW paradigm to be re-caste in terms of cubes, where each cube includes intra-links to proximally context-based information and includes inter-links to external cubes and their information.

In an embodiment, at 270, the cube navigation service retains one or more versions of the cube contents (information) and enforces access policy (policies) on each version. The policy may be identified or enforced based on the identities of the requestors. Moreover, access to any particular identity may include a different set of renderings or version of the whole cube. In other words, a particular user may have version 1 of the top, version 2 of the walls, and version 3 of the bottom. A user may have different versions for a set of walls; for example, version 1 for walls 1-3 and version 2 for wall 4. Of course a user may also have the same version for the entire cube rendering; for example version 2 of the walls, top, and bottom.

A cube can be associated with more than 4 walls to accommodate different versions or renderings of those walls can be envisioned as locked cabinets on the primary walls that can represent the entire wall. When a particular user is authorized the cabinet can be unlocked and it folds away or down to reveal a different wall or rendering for that particular authorized user. Multiple walls may also be envisioned as wall paper or a screen that covers the wall, an authorized user can change what is being displayed on the screen or peel the wall paper away to reveal a new version or another wall altogether.

In some cases, at 280, the cube navigation service facilitates, manages or permits collaboration on the cube contents (walls, top, and bottom) by multiple users. So, the cube may be associated with a wiki topic, a discussion, a blog, a meeting occurring in real time, etc.

In still another situation, at 290, the cube navigation service may represent at least one portion of the information as spanning across multiple sides of the cube. Moreover, information can be user-repositioned within the walls of the cube, in some cases. So, a diagram may span two walls and be visible in the corner of the two walls where the two walls meet. In such situations, at 291, the cube navigation service can also allow the cube to be user tilted or positioned so that two sides are simultaneously viewable within a display to the user. So, the user can see the proximity relationship between content that is affixed to a corner of two walls. The cube can even be tilted and looked at from a top-corner perspective such that 4 sides of the cube can be viewed at once.

In still more embodiments, a user may use a dual-monitor arrangement and the cube navigation service may permit one view of the cube in one monitor, such as the top (index) and another view of the cube in the other monitor, such as one or more of the walls.

Further illustrations of the cube concept and visualizations to assist in comprehension are supplied below with reference to the FIGS. 5A-E.

Figure 3:
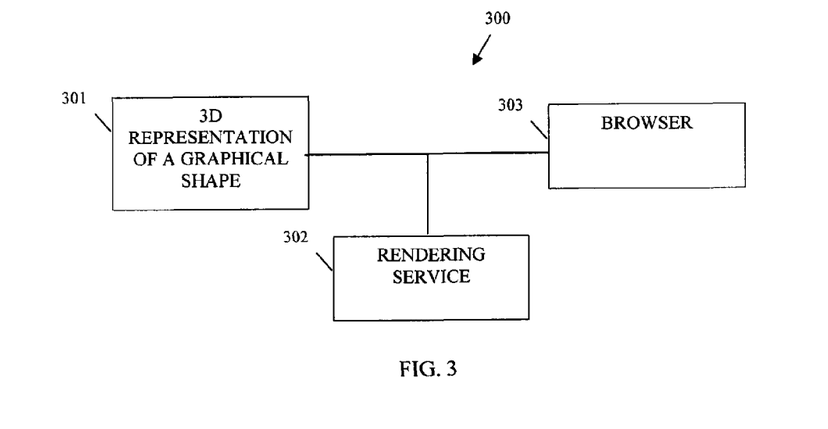
FIG. 3 is a diagram of an information modeling and navigation system, according to an example embodiment.

FIG. 3 is a diagram of an information modeling and navigation system 300, according to an example embodiment. The information modeling and navigation system 300 is implemented as instructions on or within a machine-accessible and readable medium. The instructions when executed by a machine perform processing depicted with respect to the method 100 of the FIG. 1. The information modeling and navigation system 300 is also operational over a network and the network may be wired, wireless, or a combination of wired and wireless.

The information modeling and navigation system 300 includes 3D representation of a graphical shape 301 and a rendering service 302. In an embodiment, the information modeling and navigation system 300 also includes a browser 303. Each of these and their interactions with one another will now be discussed in turn.

The graphical shape 301 is embodied and implemented in a machine or computer readable medium on a machine and is adapted to be presented on a display associated with the machine. The graphical shape 301 is represented in 3D. It may include at least three faces, such as a single side, a top, and a bottom (e.g., a cylinder). In other cases, the graphical shape 301 may include 4-6 faces (a cube is illustrative of 6 faces (4 sides, a top, and a bottom). At least one side of the graphical shape 301 is to include rendered information related to content being navigated or browsed by a user. The top of the graphical shape 301 includes summary information and the bottom of the graphical shape 301 includes background information.

In an example case, the graphical shape 301 includes a top and a bottom and eight walls or sides. The extra four walls may be viewed in one case as 4 walls that are a different version of four primary walls. In another case, they may be viewed as a room having eight walls. In another case, they may be viewed as a 4 walled room having information on both the inside and the outside of the room. The information on the inside includes 4 sets of proximally dependent information and the information on the outside includes 4 sets of its own proximally dependent information. In other cases, the eight sides or walls are not associated with a room at all but an eight to ten faced-geometric shape that can be rotated and navigated in the manners discussed herein.

In an embodiment, the graphical shape 301 may be user-defined or user-selected. In other cases, the graphical shape 301 is set by default, profile, or policy for the user in response to the identity of the user.

The rendering service 302 is also implemented in the machine or computer readable medium and is adapted to process on the machine. Example processing associated with the rendering service 302 was presented above with reference to the methods 100 and 200 of the FIGS. 1 and 2, respectively.

In operation, the rendering service 302 renders information (primary content) on at least one side of the graphical shape 301 for user manipulation, viewing, and navigation. The rendering service 302 also generates or acquires summary information about the primary content and renders this to the top of the graphical shape 301. The summary information proximally links from within the graphical shape 301 selective in context pieces of the summary information to selective in context and related pieces of the content populated to the at least one side of the graphical shape 301. The linkages may be bi-directional; meaning a link in the side may traverse or reference the top and vice-versa. These are intra 3D graphical shape 301 links based on proximity context with the 3D graphical shape 301. It is also noted that inter graphical shape 301 links may be embedded and used within the side or the top.

The rendering service 302 also renders or assembles background information that proximally links from the primary content to a bottom of the 3D graphical shape 301. Again, these are intra graphical shape 301 linkages or references, but it is understood that in some embodiments the graphical shape may also include inter-link references to other graphical shapes 301. Specific pieces of the primary content link to specific pieces of the background information on the bottom of the graphical shape 301. Again, the linkages may be bi-directional.

Once the rendering service 302 has produced a rendering of the content on the side or sides; a rendering of the summary information on the top; and a rendering of the background information on the bottom, the rendering service 302 presents the graphical shape 301 on a display for user viewing, navigation, and browsing.

In an embodiment, the information modeling and navigation system 300 may also include a browser 303. The browser is implemented in the machine medium or computer-readable medium and is to process on the machine. The browser 303 is to provide navigation operations and services that permit a user to navigate the graphical shape 301 within the display or displays being used by the user.

In one navigation operation that is supplied, the user is permitted to rotate or spin the graphical shape 301 from right to left, left to right, down and up, up and down, and rotate into a tilt position that modifies an axis of rotation for the graphical shape 301.

In another navigation operation that is supplied, the user is permitted to activate embedded links from a side or sides, a portion of the summary (top), and/or from a portion of the background (bottom) and the graphical shape 301 is automatically rotated by the browser 303 to a proper location within the graphical shape 301 for presentation on the display to the user.

In yet another navigation operation that is supplied, the user is permitted to activate embedded links that can traverse to a side of an entirely different instance of a graphical shape 301, which has other information, other summary information, and other background information. This is an example of inter graphical shape 301 linking, such that a web of information represented in 3D can be achieved.

In still another navigation operation that is supplied, the user is permitted to have the primary content, the summary information, and the background information re-rendered to an entirely different graphical shape 301 that the user defines or selects from a list of available graphical shape 301 templates.

It is understood that other more conventional features may also be integrated into the navigation operations, such as but not limited to, free text searching of the faces of the graphical object 301, free text searching of multiple different graphical objects 301, free text searching of a particular face or set of faces of a single or of multiple graphical objects 301, text or multimedia effects or display properties, plugins for services such as Java®, Adobe®, etc.

Figure 4:
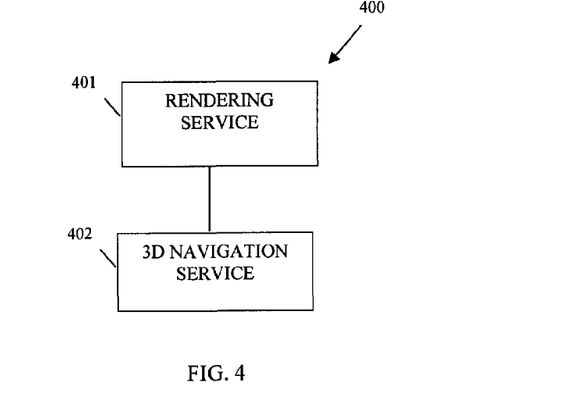
FIG. 4 is a diagram of another information modeling and navigation system, according to an example embodiment.

FIG. 4 is a diagram of another information modeling and navigation system 400, according to an example embodiment. The information modeling and navigation system 400 is implemented as instructions on or within a machine-accessible and readable medium. The instructions when executed by a machine perform processing depicted with respect to the method 200 of the FIG. 2. The information modeling and navigation system 400 is also operational over a network and the network may be wired, wireless, or a combination of wired and wireless.

The information modeling and navigation system 400 includes a rendering service 401 and a 3D navigation service 402. Each of these will now be discussed in turn. The information modeling and navigation system 400 is a specific cube implementation of the information modeling and navigation system 300 represented and discussed with reference to the FIG. 3 above.

The rendering service 401 is implemented in a machine or computer readable medium and is adapted to process on a machine. Examples of the rendering service and some of its features were presented above with reference to the method 200 of the FIG. 2.

During operation, the rendering service 401 renders information content to a 3D shape (such as but not limited to a cube) representation. The content is rendered to the walls of the 3D shape and the proximity and contextual dependencies are retained in the rendering to the walls. The top of the shape includes an index to the content on the walls and the floor or bottom of the shape includes discussions that link to the content on the walls. The index and the discussions may be considered metadata related to the information content on the walls.

The 3D navigation service 402 is implemented in a machine or computer readable medium and is adapted to process on the machine. The 3D navigation service 402 permits the information content and the index and discussions (metadata) to be navigated by rotating or spinning the shape or accessing or activating proximity based links embedded in the sides (walls, top, and bottom).

According to an embodiment, the 3D navigation service 402 also managed different versions or renderings of the sides of the shape. The 3D navigation service 402 may also manage different versions or renderings of the shape as a whole.

In another embodiment, the 3D navigation service 402 can enforce access policy against requestors that attempt to access the different versions of the one or more sides (walls, top, and bottom) or even the shape as a whole.

According to an embodiment, 3D navigation service 402 is to traverse from the index of the shape in response to a link being activated by a user to a different side of an entirely different cube instance having different information content. This permits inter shape linking and permits a web of information between shapes to be established.

In some embodiments, the 3D navigation service 402 permits an orientation of and an axis for rotation of the shape to be user-defined and user-changed for purposes of shape viewing and shape navigation.

The information content, the index, and/or the discussions may even be dynamically or batch collaborated on by multiple users. In a particular case, the shape is collaborated on by multiple users over the Internet in real-time or in a dynamic fashion. Each user processes a version or instance of the 3D navigation service 402 on each user's machine. In one case, the collaboration is a brainstorming session occurring in a geographically dispersed fashion over the Internet amongst multiple users.

One now appreciates how the entire WWW paradigm and browsing navigation may be enhanced in a novel manner to permit information to be represented and navigated in 3D. Each 3D shape having a plurality of proximity and context-sensitive based linkages within that particular 3D shape and each 3D shape capable of having inter inks to other instances of other 3D shapes. This creates a 3D web of information content.

FIGS. 5A-E are diagrams of example visual depictions of various aspects of the techniques presented herein.

Figure 5A:
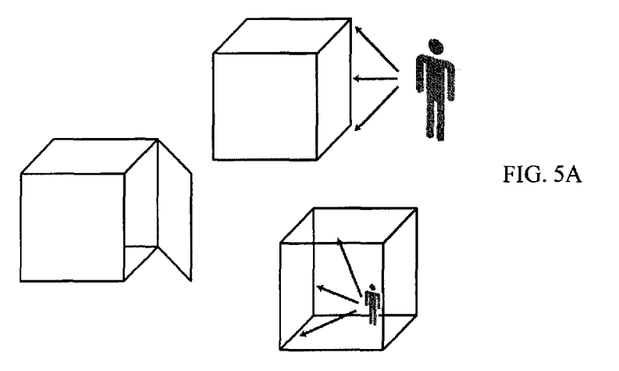
FIGS. 5A-E are diagrams of example visual depictions of various aspects of the techniques presented herein.

FIG. 5A provides three visual illustrations of a room (represented as a 3D cube). An individual in the physical world could be outside of the room as depicted in the top right viewing the room and its sides, top, and bottom from the outside. Alternatively, the individual may be inside the room viewing the walls, ceiling, and floor as depicted in the bottom right of FIG. 5A. Access to the room may be achieved by opening a door or though a particular wall as shown on the left of FIG. 5A.

FIG. 5A is presented for purposes of ease of comprehension of the concepts presented herein. That is, typically individuals in brainstorming meetings or any form of a meeting are collaborating in proximity with one another in a room. That room has 4 sides, a ceiling, and a wall. However, in the real world room the ceiling and floor are wasted space within the room, since individuals typically are not conditioned to look at the floor or the ceiling. The techniques presented herein and above are capable of modeling the proximity of information being displayed and presented in such a meeting on sides of a cube and can utilize the ceiling or top of the cube for an index to the information and the floor to link discussions or techniques and procedures used to generate the information. Therefore, there is no wasted space and the cube is conceptually more intuitive and easier to navigate than a traditional browser paradigm because it represents the real world and a user can interact with it in a manner that is similar to real world experiences. In a sense, the cube may be viewed as being placed in the palm of a user's or collaborator's hand. The user can spin the cube from left to right or right to left and can rotate the cube up and down or down and up.

Figure 5B:
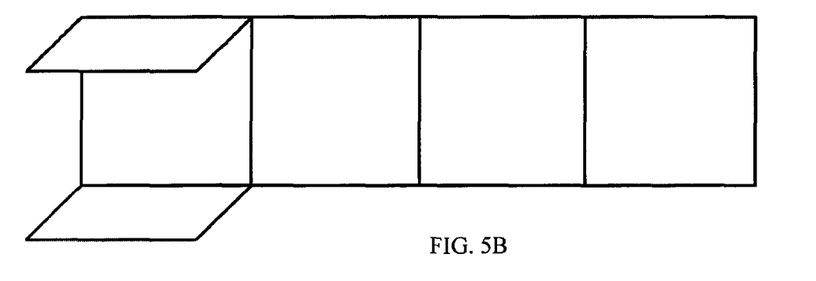

FIG. 5B illustrates the room or cube depicted in FIG. 5A being unfolded. The walls are sequential and provide proximity by each wall being a neighbor to another wall. The last wall is considered to be in proximity to the first wall. The first wall also includes the ceiling and floor as being unfolded. Note also that the ceiling and the floor are in proximity to each of the walls. The viewer can rotate the room through all of the walls allowing the rotation to convey context and proximity. The walls can be used in some embodiments for collaboration, such as blogs, wikis, group development of affinity diagrams, and the like. The ceiling, as described in some embodiments above, can be used as an index to the information on the walls; similarly, the floor can be used to link discussions related to the information on the walls. The room may be viewed as a war room or Kamra, which means room in the Urdu language.

Figure 5C:
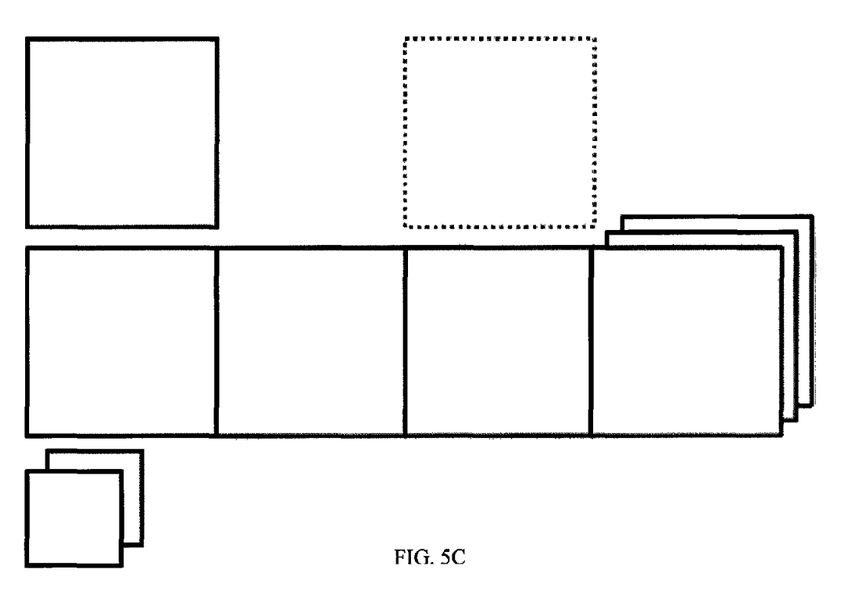

FIG. 5C illustrates the ceiling and floor being further unfolded from the room and elevated above or below the walls of the room. The additional boxes in FIG. 5C behind the floor and the last wall illustrate the concept that the walls, floor, and even the ceiling (although not depicted in FIG. 5C) can include different versions. Each version may have identity based policy that restricts access to the information on that particular version. In some cases, the version may represent a proposed rendition of information not yet accepted for the main wall or for the floor. The dotted lined box reflects the concept that each wall may have its own unique summary or index.

Figure 5D:
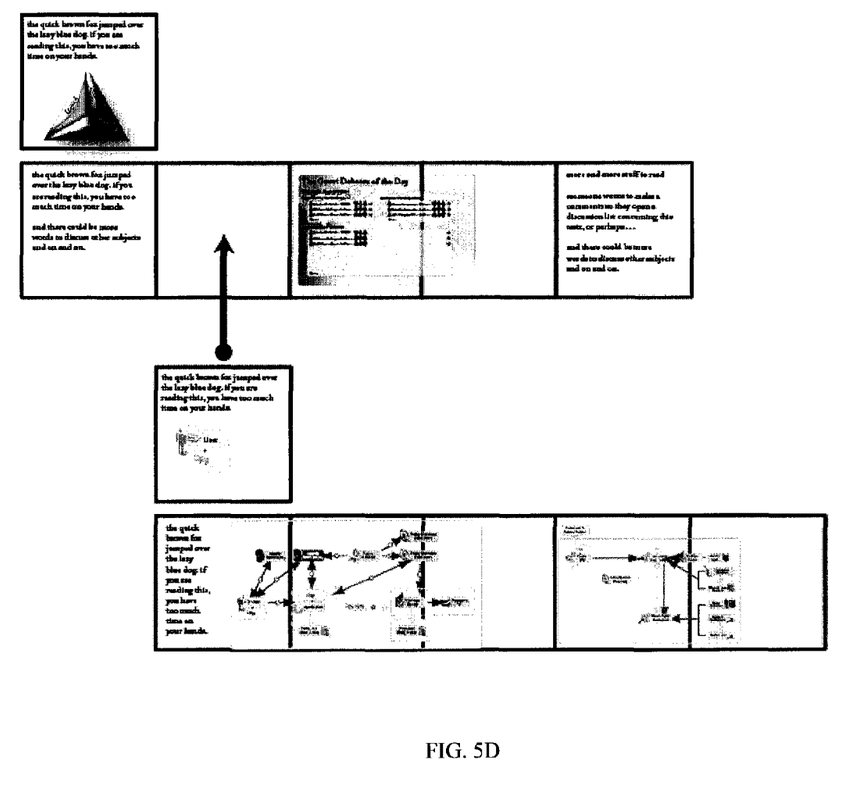

FIG. 5D illustrates that one Kamra (cube—notice the five proximity walls—in a general case there are one or more walls associated with the cube) may link to another Kamra (cube). The summary/index of the bottom cube includes a link or reference to a particular wall in the first cube. Here, the use of walls provides proximity context so the link is related to walls of a Kamra and not a typical URL. The user knows that rotating the cube from top to bottom or from bottom to top when a discussion or summary index is being viewed will reveal information or walls, this is proximity and context based navigation, which is not available with the traditional browser.

Figure 5E:
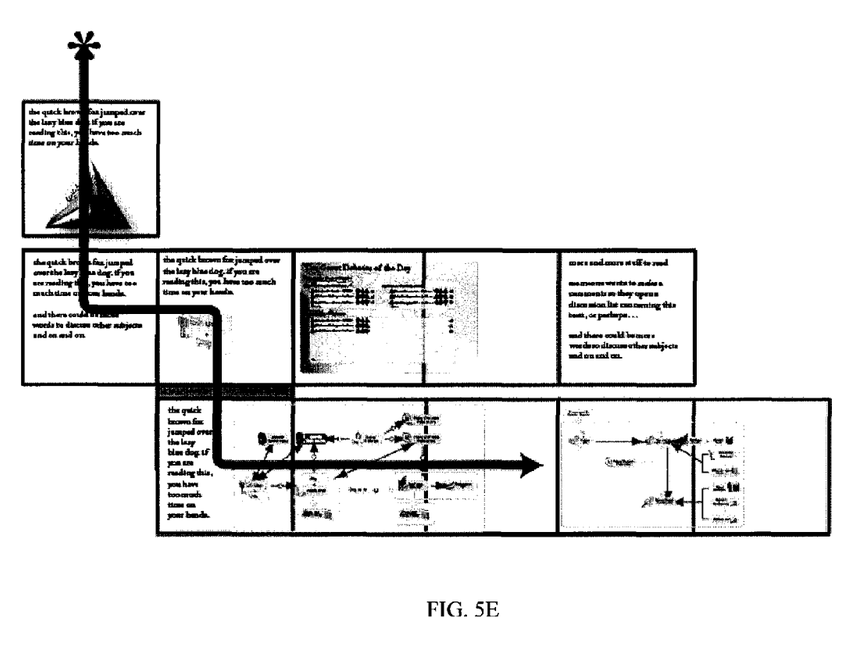

FIG. 5E illustrates navigation though multiple Kamras. Navigation may begin with the "*" on a summary index associated with the top Kamra. The user may be considered to be standing outside the room and looking at the room as a cube held in the user's hand. The user begins by rotating the cube from top to bottom to see the first wall. Next, the user rotates the cube from left to right to reveal neighboring walls in proximity context. Selecting a discussion index would rotate the cube from the wall to a discussion on the floor; that discussion may link in proximity context to another wall of another Kamra or to an alternative rendering of the same Kamra. The user then rotates the new cube from right to left to arrive at the wall having the arrow. This demonstrates proximity context navigation through a Kamra and through multiple Kamras.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    rendering information to at least one side of a three-dimensional graphical shape, the information rendered to the three-dimensional graphical shape maintains a context of where the information was placed in a real world meeting room when rendered to the three-dimensional graphical shape relative to other pieces of the information rendered to the three-dimensional graphical shape that were also situated in the real world meeting room and the information is received dynamically and in real time as the information is captured and streamed to the method;
    obtaining summary information on a top of the three-dimensional graphical shape, wherein selective portions of the summary information map to selective portions of the information, and mapping at least one icon associated with the summary information to a portion of the information;
    linking background information to the information on a bottom of the three-dimensional graphical shape, and linking a description of a manner associated with producing the information with a portion of the background information;
    permitting proximity navigation of the at least one side, the top, and the bottom for a user to navigate the information with a three-dimensional perspective; and
    maintaining proximally dependent content and metadata relationships in a self-contained manner within the three-dimensional graphical shape, and the proximally dependent content and metadata maintains proximity experienced in the real world meeting room for the information within the three-dimensional graphical shape with the rendered information of the three-dimensional graphical shape.

2. The method of claim 1 further comprising, representing the three-dimensional graphical shape as a cube having two or more sides that house the information, wherein the top houses the summary information as an index and the bottom houses the background information as discussions for the information.

3. The method of claim 1, wherein rendering further includes retaining context and proximity relationships between portions of the information.

4. The method of claim 1 further comprising, permitting the information, the summary information, and the background information of the three-dimensional graphical shape to be collaborated on or augmented by one or more multiple additional users.

5. The method of claim 1 further comprising, permitting different versions of the at least one side, the top, and the bottom to be linked and carried with the three-dimensional graphical shape.

6. The method of claim 5 further comprising, enforcing access control policy on the different versions to manage secure viewing and navigation of the different versions.

7. The method of claim 1 further comprising, permitting an initial orientation of the three-dimensional graphical shape to be changed by the user or to be user-defined for purposes of navigation.

8. The method of claim 1 further comprising, receiving a selection or definition for the three-dimensional graphical shape from the user.

9. The method of claim 1 further comprising, permitting the user to dynamically re-render the information, the summary information, and the background information from the three-dimensional graphic shape to a new user-defined or user-selected three-dimensional graphical shape.

10. A method comprising:
representing information within a cube;
retaining proximity and context dependencies for the information by selectively placing and ordering portions of the information within the cube, the proximity and context dependencies reflect where the information and proximity of the information is as the information existed in a real world meeting room and where the information was placed relative to other pieces of the information rendered to the cube that were also situated in the real world meeting room, the information within the cube is rendered to depict the proximity and context dependencies, the information captured and streamed to the method in real time for a meeting occurring in real time;
using one side of the cube as an index to selective pieces of the information represented on one or more walls of the cube, and including at least one icon that maps to a portion of the information;
using a last side of the cube to link from the selective pieces of the information to selective pieces of related information, and linking a description of a manner used for producing the information as background information for one of the selective pieces; and
dynamically altering versioning of the information in response to an identity of a user accessing the cube.

11. The method of claim 10 further comprising, allowing the index, the information and the related information to be collaborated on by multiple users.

12. The method of claim 10 further comprising, retaining one or more versions of the information, the index, and the related information and enforcing access policies to each of the versions.

13. The method of claim 10 further comprising, permitting an initial orientation of the cube to be user-defined for cube navigation purposes.

14. The method of claim 10 further comprising, including at least one index entry in the index that links to another wall of another cube having other information.

15. The method of claim 10 further comprising, permitting a user to interact with the cube and navigate the information, the index, and the related information by activating links and by spinning or rotating the cube.

16. The method of claim 10 further comprising, representing at east one portion of the information as spanning across more than one wall of the cube.

17. The method of claim 16 further comprising, tilting or positioning the cube so that two or more sides or walls are simultaneously viewable on a display, 18. A system, comprising:
a three-dimensional representation of a graphical shape embodied in a machine medium on a machine and to be presented on a display associated with the machine; and
a rendering service implemented in the machine medium and to process on the machine, wherein the rendering service is to render information content on at least one side of the graphical shape and is to render summary information that proximity links to the content on a top of the graphical shape, the summary information including at least one icon that maps to a portion of the content, and rendering service is to further render background information the proximity links from the content to a bottom of the graphical shape, and proximity for the content is maintained for the information that is rendered within the graphical shape as the content existed and is represented in a real world situation, the background information including at least one link to a description for a manner in which the content was produced, and wherein the rendering service is to present the rendered content, the summary information, and the background information within the graphical shape on the display for subsequent navigation, and at least one side of the graphical shape includes locked portions of the information that is configured to be unlocked for view when a particular user with authorization selects the locked portions to reveal hidden information, the at least one side depicts a screen or wall paper with some information displayed thereon including a locked cabinet and when the particular user accesses the at least one side with the locked cabinet, the wall paper peels away to reveal the hidden information for the particular user, and the graphical shape enabled to permit free-text searching of a selected set of faces for the graphical shape.

19. The system of claim 18 further comprising, a browser implemented in the machine medium and to process on the machine, wherein the browser is to provide navigation operations to permit a user to navigate the graphical shape within the display.

20. The system of claim 19, wherein at least one of the navigation operations is to permit the user to rotate or spin the graphical shape from right to left, left to right, up and down, down and up, and into a tilt position that modifies an axis of rotation for the graphical shape.

21. The system of claim 19, wherein at least one of the navigation operations is to permit a link to be activated from the at least one side, a portion of the summary information, and a portion of the background information, and wherein when the link is activated the graphical shape is rotated to a proper location automatically.

22. The system of claim 19, wherein at least one of the navigation operations is to permit a link to be activated that automatically traverses to a side of an entirely different graphical shape having other information, other summary information, and other background information.

23. The system of claim 19, wherein rendering service is to permit a user to have the information, the summary information, and the background information re-rendered to a different graphical shape selected or defined by the user.

24. A system, comprising:

a rendering service implemented in a machine medium and to process on a machine; and a three-dimensional navigation service implemented in the machine and to process on the machine, wherein the rendering service is to render information content to a three-dimensional shape representation, and wherein the three-dimensional navigation service is to permit the information to be navigated by rotating the shape or accessing proximity based links embedded within sides of the shape and housing different aspects of the information or other metadata related to the information, some of the information on some portions of the shape only capable of being revealed by selection or action of an authorized user, the some portions of the shape depict a screen or wall paper with some information displayed thereon including a locked cabinet and when the authorized user accesses the some portions of the shape having the locked cabinet, the wall paper peels away to reveal hidden information for the authorized user, and the information content of the three-dimensional shape is dynamically collected and collaborated on by multiple users, and including on at least one side of the shape an icon that maps to a portion of the information and a particular link that links to a description for a manner in which the information was produced, and the proximity based links maintain proximity that existed between components in a real world situation for the components of the information rendered within the three-dimensional shape.

25. The system of claim 24, wherein the three-dimensional navigation service is to manage different versions of one or more of the sides or is to manage different versions of the shape as a whole.

26. The system of claim 25, wherein the three-dimensional navigation service is to enforce access policy against requestors that attempt to access the different versions of the one or more of the sides or of the shape as a whole.

27. The system of claim 24, wherein the shape includes four sides to house the information, a top to house an index to the information, and a bottom to house discussions on the information, and wherein the index and the discussions are the metadata related to the information.

28. The system of claim 27, wherein the three-dimensional navigation service is to traverse from the index of the shape in response to a link being activated to a different side of a different shape having different information.

29. The system of claim 24, wherein the three-dimension navigation service is to permit an orientation of and an axis for rotation of the shape to be user-defined for purposes of viewing and navigation.

30. The system of claim 24, wherein the shape is to be collaborated on by multiple users over the Internet in real-time, each user processes a version of the three-dimensional navigation service on each user's machine.

31. The system of claim 30, wherein the collaboration is associated with a brainstorming session occurring in a geographically disperse fashion over the Internet amongst the multiple users.

\* \* \* \* \*

UNITED STATES PATENT AND TRADEMARK OFFICE
CERTIFICATE OF CORRECTION

PATENT NO. : 8,972,898 B2  Page 1 of 1
APPLICATION NO. : 11/671660
DATED : March 3, 2015
INVENTOR(S) : Stephen R. Carter It is certified that error appears in the above-identified patent and that said Letters Patent is hereby corrected as shown below:

In the Claims

In column 14, line 2, in Claim 16, delete "east" and insert --least--, therefor In column 14, line 6, in Claim 17, delete "display," and insert --display.--, therefor In column 14, line 20, in Claim 18, delete "the" and insert --that--, therefor In column 16, line 18, in Claim 29, delete "three-dimension" and insert --three-dimensional--, therefor Signed and Sealed this
Eleventh Day of August, 2015

Michelle K. Lee
*Director of the United States Patent and Trademark Office*